United States Patent
Danelli et al.

(10) Patent No.: US 9,726,311 B2
(45) Date of Patent: Aug. 8, 2017

(54) MULTI-COUPLING DEVICE WITH PRESSURE RELIEF CIRCUIT

(71) Applicant: Faster S.P.A., Rivolta D'Adda (IT)

(72) Inventors: Alessandro Danelli, Brignano Gera D'Adda (IT); Roberto Sorbi, Rivolta D'Adda (IT)

(73) Assignee: Faster S.P.A., Rivolta D'Adda (IT)

( * ) Notice: Subject to any disclaimer, the term of this patent is extended or adjusted under 35 U.S.C. 154(b) by 28 days.

(21) Appl. No.: 14/884,565

(22) Filed: Oct. 15, 2015

(65) Prior Publication Data
US 2016/0109044 A1 Apr. 21, 2016

(30) Foreign Application Priority Data
Oct. 15, 2014 (IT) .............. MI2014A1792

(51) Int. Cl.
| | |
|---|---|
| *F16L 21/08* | (2006.01) |
| *F16L 37/107* | (2006.01) |
| *F16L 37/30* | (2006.01) |
| *E02F 3/36* | (2006.01) |
| *E02F 9/22* | (2006.01) |
| *F16L 37/367* | (2006.01) |
| *F16L 37/56* | (2006.01) |
| *F16K 17/02* | (2006.01) |
| *F16L 29/00* | (2006.01) |

(52) U.S. Cl.
CPC ............ *F16L 21/08* (2013.01); *E02F 3/3654* (2013.01); *E02F 9/2275* (2013.01); *F16K 17/02* (2013.01); *F16L 29/007* (2013.01); *F16L 37/107* (2013.01); *F16L 37/30* (2013.01); *F16L 37/367* (2013.01); *F16L 37/56* (2013.01); *Y10T 137/87153* (2015.04)

(58) Field of Classification Search
CPC ....... F16L 37/107; F16L 37/24; F16L 37/248; F16L 37/30; F16L 37/26; F16L 29/007; F16L 21/08; Y10T 137/87153
USPC ........................................ 137/614.03–614.05
See application file for complete search history.

(56) References Cited

U.S. PATENT DOCUMENTS

| | | | |
|---|---|---|---|
| 2,399,525 A | 4/1946 | Wang | |
| 5,791,376 A * | 8/1998 | Richmond | .............. F16L 37/30 137/614 |
| 6,106,026 A * | 8/2000 | Smith, III | ................. F16L 1/26 285/84 |

(Continued)

FOREIGN PATENT DOCUMENTS

EP      2476941      7/2012

*Primary Examiner* — Kevin Lee
(74) *Attorney, Agent, or Firm* — Stetina Brunda Garred & Brucker

(57) ABSTRACT

The present invention relates to a multi-coupling device of the plate type for the simultaneous connection of a plurality of hydraulic, electric and pneumatic lines through quick couplings.

The device according to the present invention is characterized in that it comprises bayonet coupling means which allow the coupling of the two plates by means of the relative sliding of the mobile plate with respect to the fixed plate.

By virtue of the presence of a dedicated hydraulic circuit which connects the female couplings of the fixed plate to one another, the multi-coupling device according to the present invention allows to separate the step of coupling of the plates from the step of hydraulic connection of the male and female couplings.

13 Claims, 10 Drawing Sheets

(56) References Cited

U.S. PATENT DOCUMENTS

| | | | |
|---|---|---|---|
| 6,453,945 B1* | 9/2002 | Schumacher et al. | E02F 3/627 137/614.04 |
| 7,681,925 B2* | 3/2010 | Lambert et al. | F16L 37/248 285/316 |
| 2010/0090458 A1* | 4/2010 | Schulz et al. | F16L 37/248 285/26 |
| 2014/0041187 A1 | 2/2014 | Norton | |

* cited by examiner

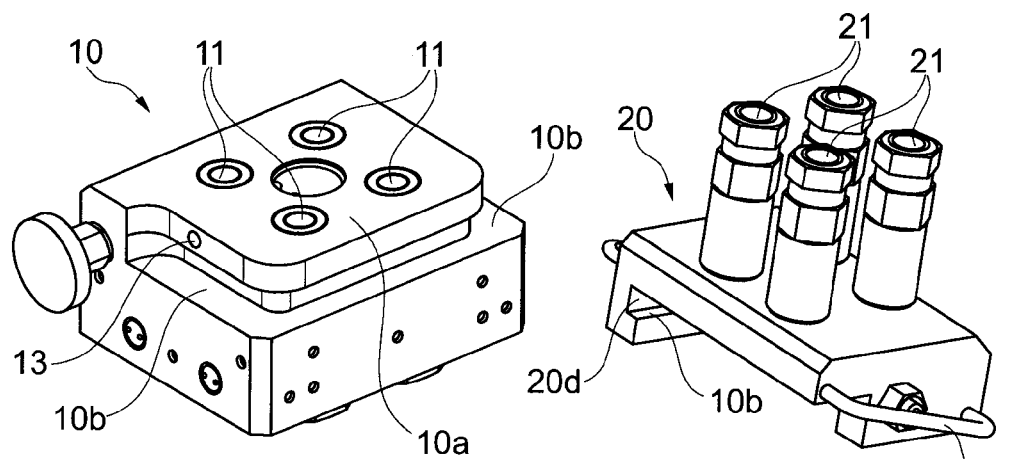
Fig. 1
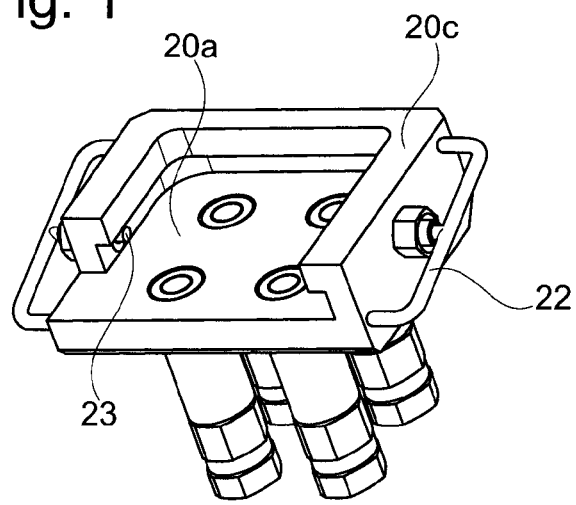
Fig. 2
Fig. 3
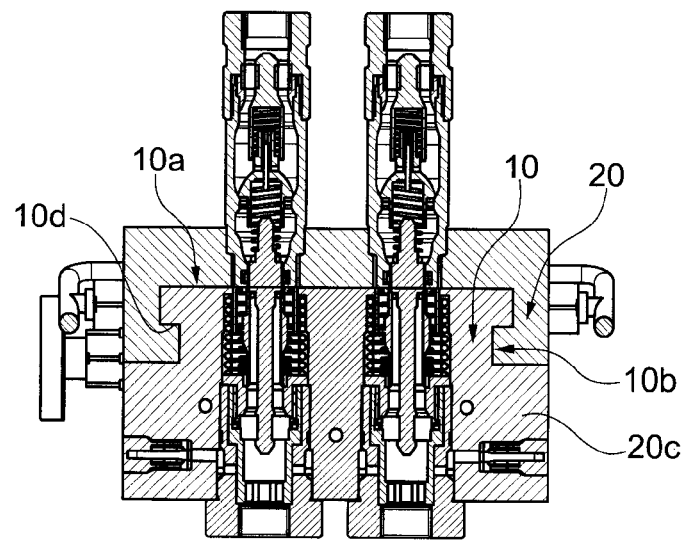
Fig. 4

MULTI-COUPLING DEVICE WITH PRESSURE RELIEF CIRCUIT

CROSS REFERENCE TO RELATED APPLICATIONS

The present application claims priority to Italian Patent Application No. MI2014A001792 filed Oct. 15, 2014, the entirety of the disclosures of which are expressly incorporated herein by reference.

STATEMENT RE: FEDERALLY SPONSORED RESEARCH/DEVELOPMENT

Not Applicable.

FIELD OF THE INVENTION

The present invention relates to a multi-coupling device of the plate type for the simultaneous connection of a plurality of hydraulic and/or pneumatic lines through quick couplings.

PRIOR ART

Systems which allow the simultaneous manual coupling of multiple hydraulic lines at the same time have been present on the market for several years in various industrial sectors.

In particular, but not exclusively, in the farming sector, for connecting forks, buckets, lifters and farming equipment in general to be connected, for example, to a tractor; in the constructions sector, for earth-moving machines used for asphalting or cementing; in hydraulic hammers and the like; in the transport sector, for connecting snowploughs, trailers and the like to a vehicle, and so on.

Granted the above, the need is thus particularly felt to be able to connect several hydraulic, electric and pneumatic lines effectively and safely for the operator performing such an operation; i.e. to save time, to avoid leakages of fluids or inclusions of air in the lines during the steps of connecting and disconnecting and to avoid dangerous connection errors, such as, for example, the inversion of two lines.

Various technical solutions have been developed to respond to these needs, such as a multi-connection plate marketed under the brand name "Multifaster", which is the object of Italian patent IT1271165 for some aspects, and of European patents EP0787905B1 and EP0522493B2 for others, all owned by the Applicant. Such multi-connection plates consist of two connection plates, one of which is connected to an auxiliary device to be connected, and is thus mobile, while the other is usually connected to the vehicle or to the apparatus to which the auxiliary device must be connected, and is thus fixed.

Each of the two plates thus houses a plurality of quick couplings. In particular, the fixed plate is preferably equipped with female part flat-face couplings, whilst the mobile plate is equipped with corresponding male part flat-face couplings. From 1 to 12 hydraulic and/or pneumatic lines are present at the same time on such plates.

The mobile plate is connected and disconnected from/to the fixed plate by virtue of a locking handle or lever, which can be easily grasped by the operator and which can pivot about a fulcrum integral with the main body to which the fixed plate is connected. Usually, said lever is handle-shaped and hinged to two sides of the fixed plate, each of the two stretches of the handle hinged to said plate having a cam guide or groove capable of housing appropriate pins provided on the mobile plate, so that the action of said cam groove on the pins causes the mobile plate to approach the fixed plate, thus facilitating the correct insertion of the couplings and keeping the two plates stably connected during the entire operating period during which said lever is locked in lowered position.

If pressurized fluid, generally oil, is present in the lines, the coupling of the plates requires a considerable physical effort by the operator, who must substantially cause the actuation of the residual pressure relief means, where provided.

The levers must be appropriately dimensioned by making them longer in order to reduce the effort that the operator must apply on them. This implies larger dimensions, to the extent that a specific clearance must be provided on the working machine to allow to rotate the levers.

It is thus a drawback which afflicts the multi-coupling device of the plate types that of being provided with a lever which implies considerable efforts by the operator and considerable dimensions in terms of clearance for actuating the lever.

A further drawback is in the difficulty of effectively relieving the residual pressure possibly present in the couplings which determines high coupling efforts, as mentioned.

Not last, it is known with the multi-coupling connections of known type to relieve the pressure present in the system for safety reasons before the disconnection by operating directly on the hydraulic circuit of the working machine. It is thus the object of the present invention to provide a multi-coupling device in which the pressure can be relieved autonomously before the disconnection maneuver.

SUMMARY OF THE INVENTION

It is thus the main task of the present invention to provide a multi-coupling device which allows to overcome the drawbacks which afflict the solutions of known type.

In the scope of this task, it is the object of the present invention to provide a multi-coupling device of the plate type of small dimensions, i.e. which requires a much smaller clearance than that required by the lever multi-connection plate types of known type.

It is also the object of the present invention to provide a multi-coupling device of the plate type which allows simple operations during the step of coupling and of uncoupling the mobile plate to/from the fixed plate.

It is a further object of the present invention to provide a multi-coupling device of the plate type which allows the connection of the single couplings only in a moment after the connection of the two plates, i.e. only in the moment in which pressure is applied at the female coupling in at least one single line.

This task and the other objects which will be more apparent from the description below are achieved by a multi-coupling device as disclosed in the appended claims which form an integral part of the present description.

LIST OF FIGURES

Further features and advantages of the present invention will be more apparent in the following detailed description provided by way of non-limitative example and illustrated in the accompanying figures, in which:

FIG. 1 is a perspective view of a fixed plate of a multi-coupling device of the plate type according to the present invention;

FIG. 2 is a perspective view of a mobile plate supporting a plurality of male couplings of the device of the plate type according to the present invention;

FIG. 3 is an upside-down view of the mobile plate in FIG. 2;

FIG. 4 is a section view taken along a vertical plane of the two coupled fixed and mobile plates of the device according to the present invention but in which the couplings are not yet coupled;

Figure 5:
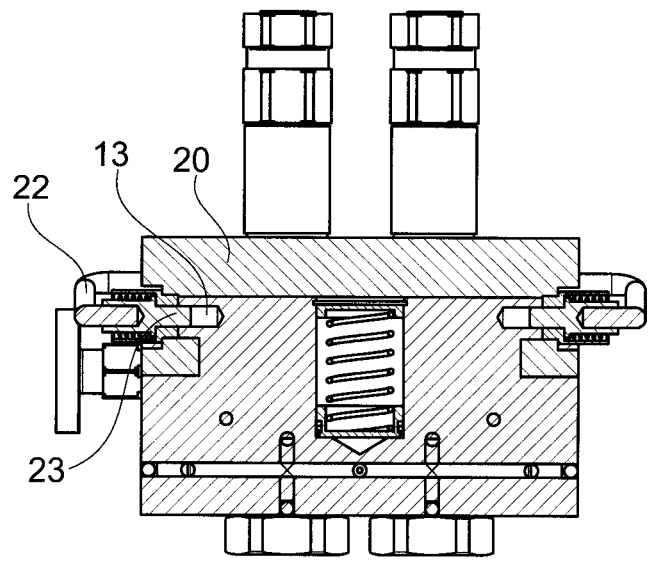
FIG. 5 shows, again in section taken along a vertical plane, the multi-coupling device of the plate type according to the present invention in which other details are highlighted.

Figures from 11a to 11g show a functional diagram of the hydraulic circuit in the various steps of operation of the device according to the present invention.

DETAILED DESCRIPTION

With reference to the accompanying figures, in particular to FIGS. 1 and 2, reference numeral 10 indicates the so-called "fixed" plate, i.e. adapted to be connected to the machine. The fixed plate 10 preferably supports a plurality of female couplings 11. Reference numeral 20 indicates the mobile plate, which preferably supports a plurality of male couplings 21.

The fixed plate 10 has an flat upper coupling surface 10a, from which the female couplings 11 protrude, which according to a preferred embodiment of the preferred embodiment are flat-face couplings.

Flat-face couplings are known and well defined in general terms in the prior art, however the female flat-face couplings which equip the fixed plate of the multi-coupling device according to the present invention have some particularities which distinguish them from the prior art, as described in greater detail below.

Again with reference to FIG. 1, the fixed plate 10 has a groove 10b which runs at least along part of the perimeter of the upper surface 10a.

More in particular, again with reference to the preferred embodiment of the present invention shown in FIG. 1, said groove 10b runs along at least three of the four sides of said first plate, which is substantially quadrangular, more preferably, but not necessarily rectangular.

With reference to the section in FIG. 4, which shows the fixed plate 10 and the mobile plate 20 coupled, the fixed plate 10 has the coupling surface 10a protruding upwards.

The fixed plate 10 thus comprises a base or lower portion 10c, a recess or groove 10b, and an upper coupling surface 10a.

The recess or groove 10b defines a first C-shaped profile on the cross-section, which turns its concavity towards the outside of the plate identified by said base portion 10c and the upper surface 10a.

With reference in particular to FIGS. 2, 3 and 4, the mobile plate 20 also has a second C-shaped profile, which turns its concavity towards the inside of the plate. More in particular, peripherally with respect to the coupling surface 20a, the mobile plate 20 has a second profile, also C-shaped on the vertical transversal plane, defined by a recess 20b defining the concavity of said second C-shaped profile, and a protrusion 20d, which extends towards the inside of the plate and is adapted to strike against the protrusion 10d which closes the first C-shaped profile of said fixed plate 10 on top.

Substantially, the first C-shaped profile of said fixed plate 10 and the second C-shaped profile of said mobile plate 20 define bayonet coupling means for connecting said mobile plate 20 to said fixed plate 10 by the sliding of the mobile plate 20 relatively to the fixed plate 10 according to a coupling direction perpendicular to the axis of the couplings.

Said bayonet coupling means thus allow the stable connection of the mobile plate to the fixed plate by means of a relative sliding movement along a sliding direction substantially perpendicular to the axis of the couplings.

In the configuration of FIG. 4, the male 21 and female 11 couplings connected to the mobile plate 20 and to the fixed plate 10, respectively, are not hydraulically connected although the plates are coupled by virtue of the bayonet coupling means.

As shown in greater detail in FIG. 5, after coupling the plates, the locking means allow to lock the two plates stably so as to prevent an accidental uncoupling thereof.

In particular, according to the preferred embodiment illustrated by way of example in the accompanying figures, such locking means may comprise a handle 22 connected to the mobile plate 20 which can be gripped by the user to actuate the mobile plate itself.

Said handle 22 is preferably hinged to said mobile plate 20 at the side surface 20c of said mobile plate 20.

A safety pin 23 may be advantageously provided at the hinging point of the handle 22 of the mobile plate 20, the pin being axially mobile along a direction of insertion/disconnection which is substantially perpendicular to said surface 20c of said mobile plate 20 to which said handle 22 is hinged.

Said safety pin 23 is adapted to be inserted in a corresponding hole 13 provided for this purpose at the side surface of said fixed plate 10, preferably at the side surface of said protrusion 10d, so as to lock the possibility of relative translation of the two plates.

Advantageously, said safety pin 23 is associated to elastic means which tend to take said pin 23 to be inserted in said hole 13, so that the user must contrast the action of said elastic means to pull the safety pin 23 out from said hole 13 and to be able to couple the two plates by making the mobile plate 20 translate with respect to the fixed plate 10.

According to the preferred embodiment of the multi-coupling device of the plate type according to the present invention, said safety pin 23 is directly actuated by said handle 22: the handle 22 may be gripped by the user and extracted by moving said handle away from the plate. By extracting the handle, the user contrasts the elastic means and causes the disconnection of the safety pin 23 from the hole 13; by leaving the handle, the elastic means will tend to take said safety pin 23 to be inserted in said hole 13.

By virtue of this contrivance, when the user inserts the mobile plate 20 in the C-shaped guide of the fixed plate 10 and makes the mobile plate run with respect to the fixed plate, only when the mobile plate 20 reaches the correct limit stop position the pin 23 will be at said hole 13; when the handle is released, the operator will hear the pin snap and see the handle return to the extracted position.

Preferably, said locking means may comprise a pair of handles 22 each placed at one side of the mobile plate 20 and consequently a pair of lock pins 23.

In the multi-coupling plates of known type, the coupling of the two plates implies the simultaneous connection of the connection lines: when the mobile plate is coupled to the fixed plate by means of the cam and lever mechanisms of known type, the mobile plate is secured onto the fixed plate with a substantially translational movement according to a direction parallel to the axes of the couplings. With the multi-coupling device according to the present invention, instead, the two steps of coupling the plates and of connecting the couplings are distinct.

According to a preferred embodiment of the present invention shown in the accompanying figures, the female couplings are structured as follows.

Figure 6:
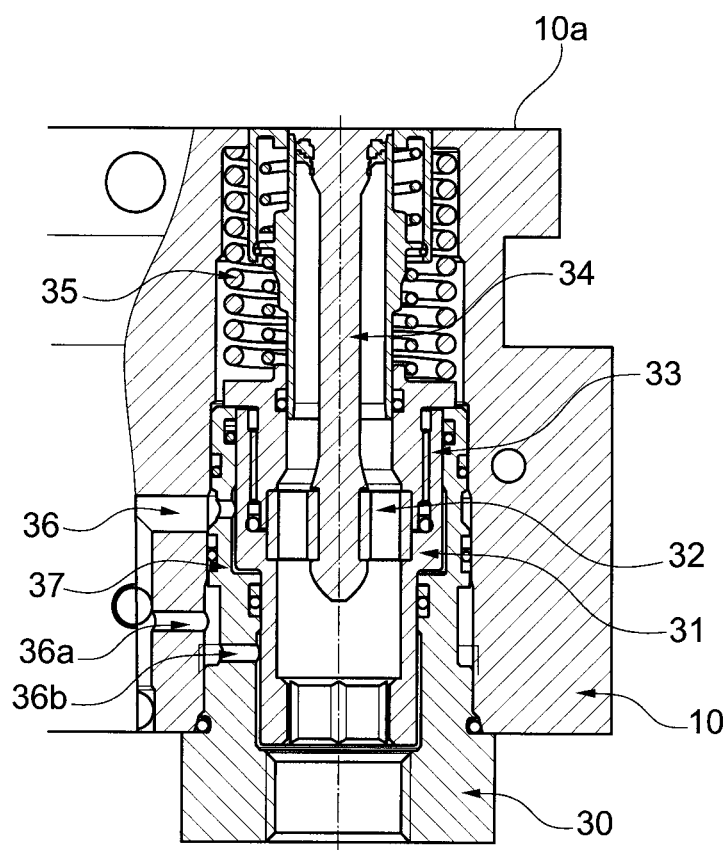
FIG. 6 shows a section view of a detail of one of the female couplings of the device according to the present invention.

With particular reference to FIG. 6, for each female coupling the multi-coupling device according to the invention comprises an adapter 30, which is connected, preferably screwed, to the fixed plate 10.

Said adapter 30 comprises a substantially hollow cylindrical body adapted to house a back inner body 31, also having a substantially hollow cylindrical shape, arranged coaxially to said adapter 30.

A series of seals creates a thrust chamber 37 between said back inner body 31 and said adapter 30. Said thrust chamber 37 is in fluid connection with a pipe 36, which is hydraulically connected to the main hydraulic line 201a, 201b (see the hydraulic coupling in FIG. 10), which axially runs along the female coupling by means of one or more holes 36a, 36b.

Furthermore, one or more one-way valves may be advantageously provided between said one or more holes 36a, 36b and said pipe 36, so that the fluid can run along said pipe in only one direction.

The chamber 37 is hydraulically imbalanced and, if pressurized, works as a hydraulic cylinder, i.e. pushes the back inner body 31 in axial direction.

Furthermore, a front inner body 33, a pair of half shells 32 and a valve 34 are stably connected to said back inner body 31.

When the hydraulic circuit to which the female coupling is connected is pressurized, the pressurization in the thrust chamber 37 causes the displacement of the back inner body 31, of the front inner body and of the valve 34 in axial direction, thus realizing the connection with the male coupling which is aligned with said female coupling.

A rearming spring 35 is interposed between the fixed plate 10 and said front inner body 33 and tends to return said front inner body 33, and consequently said back inner body 31, to retracted position, thus returning the valve 34 to closing when the female coupling, and in particular the chamber 37, is no longer pressurized, i.e. in the case in which the pipe 36 is relieved.

In addition to the described female coupling, a pipe 36, which comprises one or more holes 36a, 36b in which a series of one-way valves controls the fluid flow, is present and integrated in the fixed part.

Figure 7:
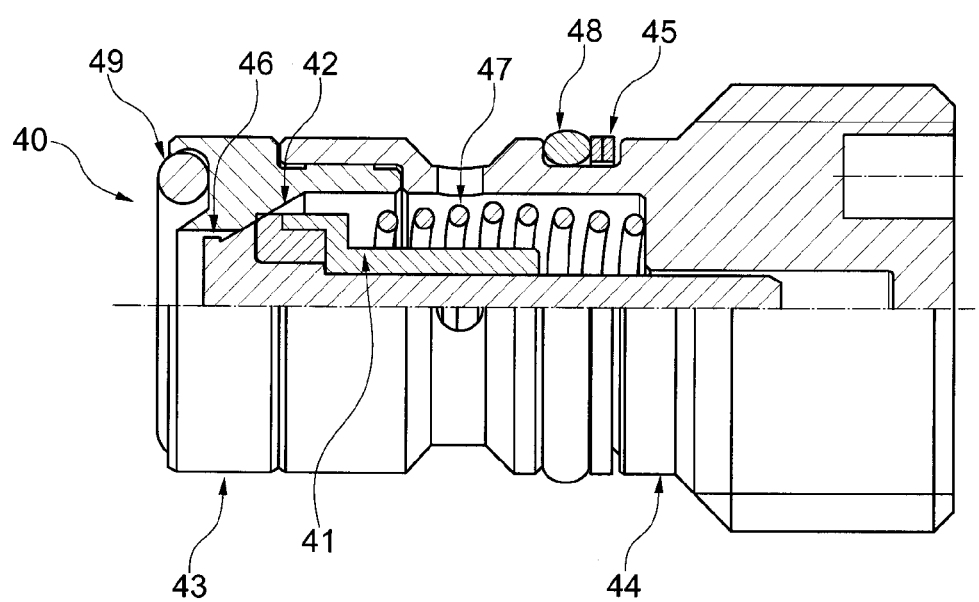
FIG. 7 shows in detail a one-way valve with which the hydraulic circuit of the device according to the present invention is equipped.

By way of non-limiting example, FIG. 7 shows an example of one-way valve 40, which comprises at least one stuffing box 41, a seal 42, a front body 43, a rear body 44, an anti-extrusion ring 45, a valve body 46, a spring 47, a first o-ring 48 and a second o-ring 49.

As described in greater detail below commenting the hydraulic diagram in FIG. 10, the multi-coupling device according to the present invention further comprises a hydraulic circuit 200, which connects the female couplings 11 to one another, in said first plate 10. The presence of one-way valves 40 on said hydraulic circuit 200 allows to control the movement of all female couplings simultaneously.

Similarly, other one-way valves of said hydraulic circuit 200 may be appropriately arranged so as to lock all the females simultaneously in coupled position also if the pressure of the fluid which determined the coupling of the couplings is missing or simply decreases.

The multi-coupling device according to the present invention further comprises mechanical locking and decompression means 100.

More in particular, the locking and decompression means 100 advantageously comprise a mechanical catch 110 which can be manually actuated by the user connected to pressure relief means 120, comprising a decompression valve 121.

Figure 8:
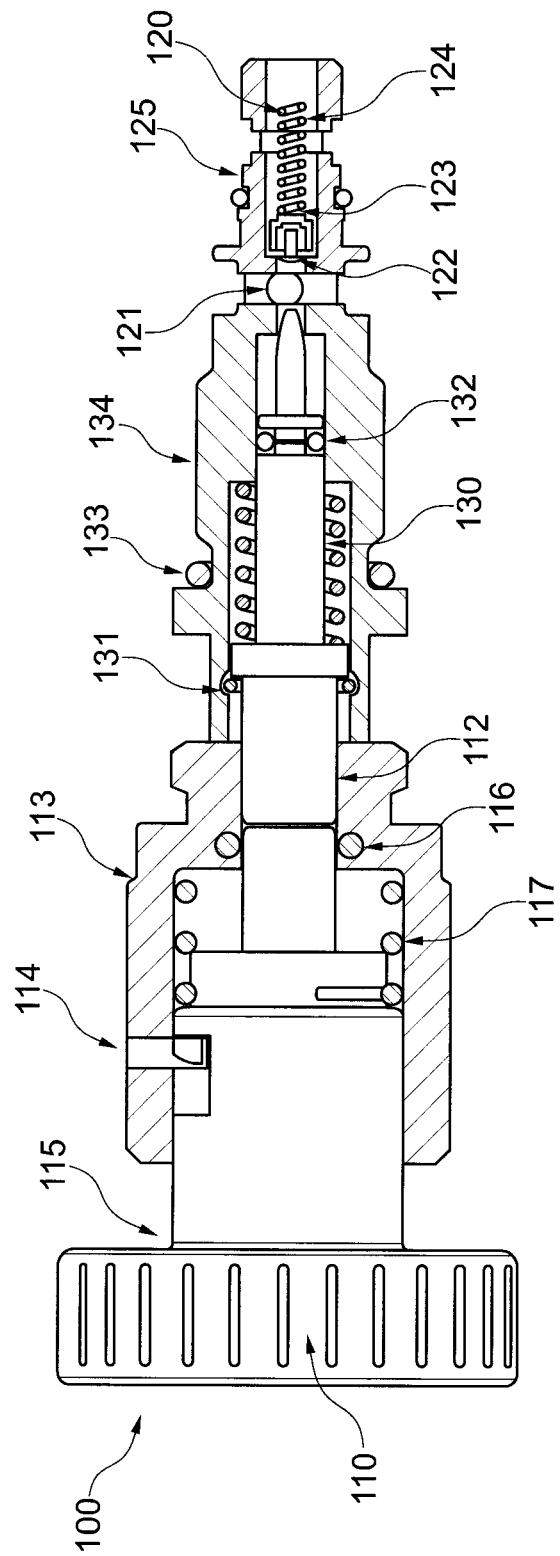
FIG. 8 shows a partial section overview of mechanical catch means provided with a decompression system which equips the multi-coupling device of the plate type according to the present invention.

Again, more in particular, with reference to FIG. 8, said mechanical catch 110 comprises an actuating button 115 which is slidingly associated to a pawl 113, a rearming spring 117 being interposed between said button 115 and said pawl 113. Said actuating button 115 is adapted to interact, in its axial stroke, with a decompression shaft 112 which is adapted to interact with the decompression valve 121 of said pressure relief means 120, keeping it open.

Preferably, the decompression valve 121 may comprise a seal 122, a stuffing box 123 and a spring 124 which contrasts the action of said decompression shaft 121, the axial stroke of which, in turn, is contrasted in approach to said valve 121 by the presence of a contrast spring 130 which acts between said decompression shaft 121 and the outer containment body 134 of said decompression shaft 121.

Seals and in particular o-rings 125, 132 and 133 are provided for ensure the hydraulic tightness between the various elements.

The actuation of the actuating button 115 of the mechanical catch 110 and the consequent decompression of the hydraulic lines of the female couplings of the fixed plate 10 of the multi-coupling device according to the present invention occurs by following a very precise sequence of actions in order to avoid compressions and/or accidental releases, and not by simple compression.

More in particular, a guide pin 114 adapted to be inserted in a corresponding helical guide groove formed on said containment pawl 113 is appropriately provided on said actuating button 115.

In this manner, the user must axially push said actuating button 115, then turn said button in order to actuate the decompression means: the rotation of said actuating button 115 causes the movement of the guide pin 114 within the helical groove: the helical groove transforms the rotatory movement of the actuating button 115 into a translational movement of said button which may thus axially translate with a stroke sufficient to cause the thrust of said decompression shaft 112, which interacts with the decompression valve 121, keeping it open.

Pressure is relieved from all chambers 37 of all female couplings simultaneously when the decompression valve 121 actuated.

Figure 10:
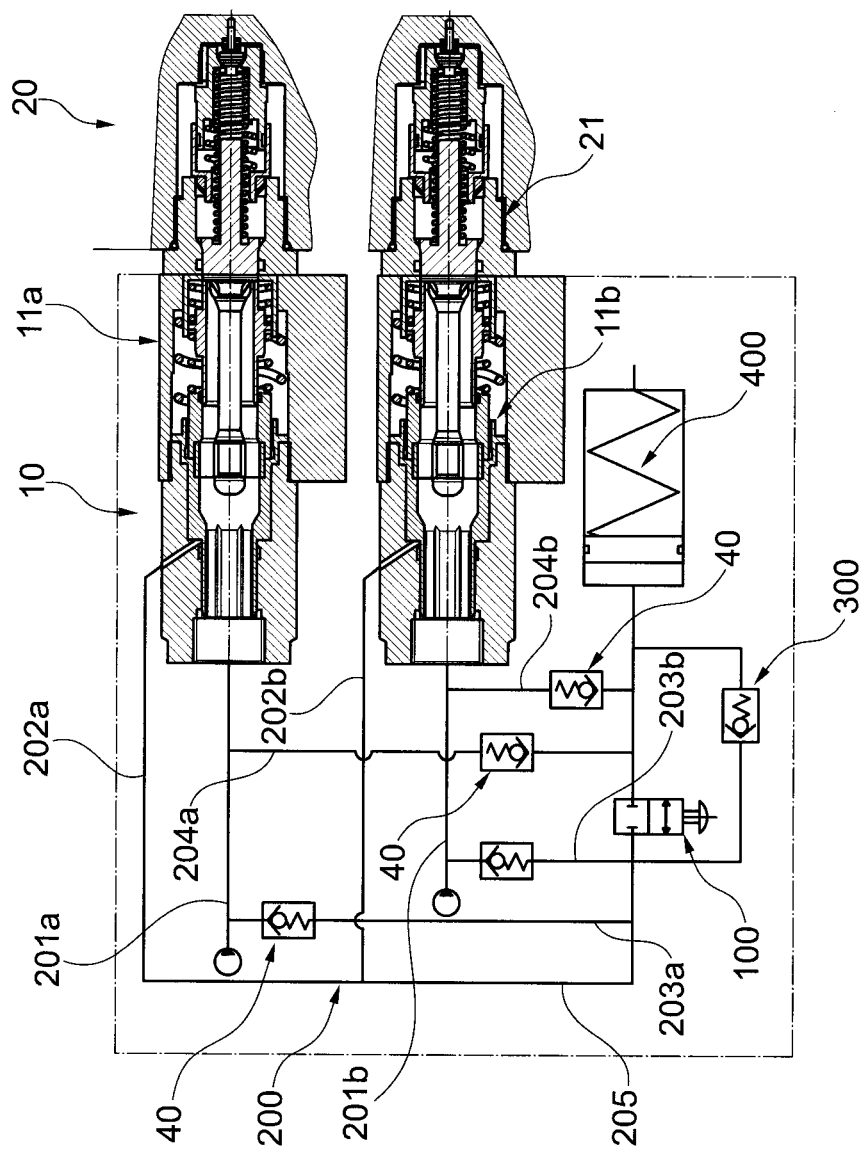
FIG. 10 shows the hydraulic diagram of the circuit which equips the multi-coupling device of the plate type according to the present invention.

Understanding the shape of the hydraulic circuit 200 as illustrated in FIG. 10, which shows a circuit connecting only two female couplings 11a and 11b by way of example is necessary in order to understand the operation of the decompression system.

It is understood that the following description provided with reference to the two couplings 11a and 11b can be generalized also to the case of more than two couplings.

Said hydraulic circuit 200 can be housed in said fixed plate 10 and comprises, for each female coupling 11a, 11b, at least one main hydraulic line 201a, 201b, respectively; at least one secondary hydraulic line 202a, 202b connected to said pipe 36 of the female connector and in fluid connection with a drain line 205 connected to said locking and decompression means 100, also belonging to said hydraulic circuit and in fluid connection through said locking and decompression means 100 with all the female couplings present on the fixed plate; at least one hydraulic supply connection 203a, 203b for each coupling and one return connection 204a, 204b, which connect said main hydraulic line 201a, 201b to the drain line 205, respectively; at least one maximum pressure valve 300 and at least one accumulator 400.

A plurality of one-way valves 40 are further arranged on the various hydraulic lines, as will be illustrated in greater detail below when describing the operation of the hydraulic circuit which characterizes the multi-coupling device according to the present invention with reference to FIG. 10.

Figure 11A:
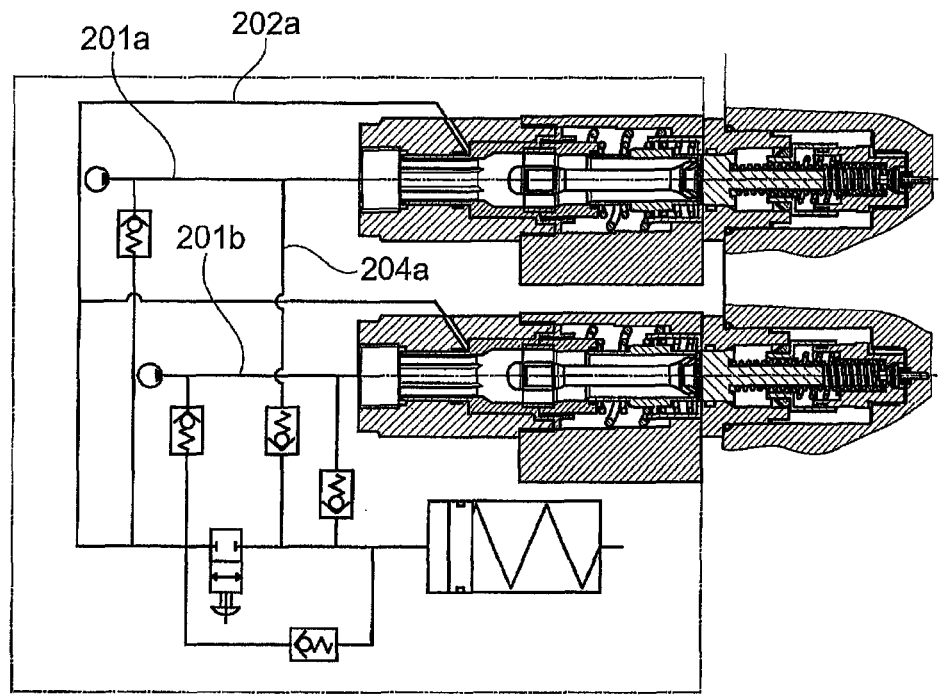

FIG. 11a shows the functional diagram of the circuit at rest.

Figure 11B:
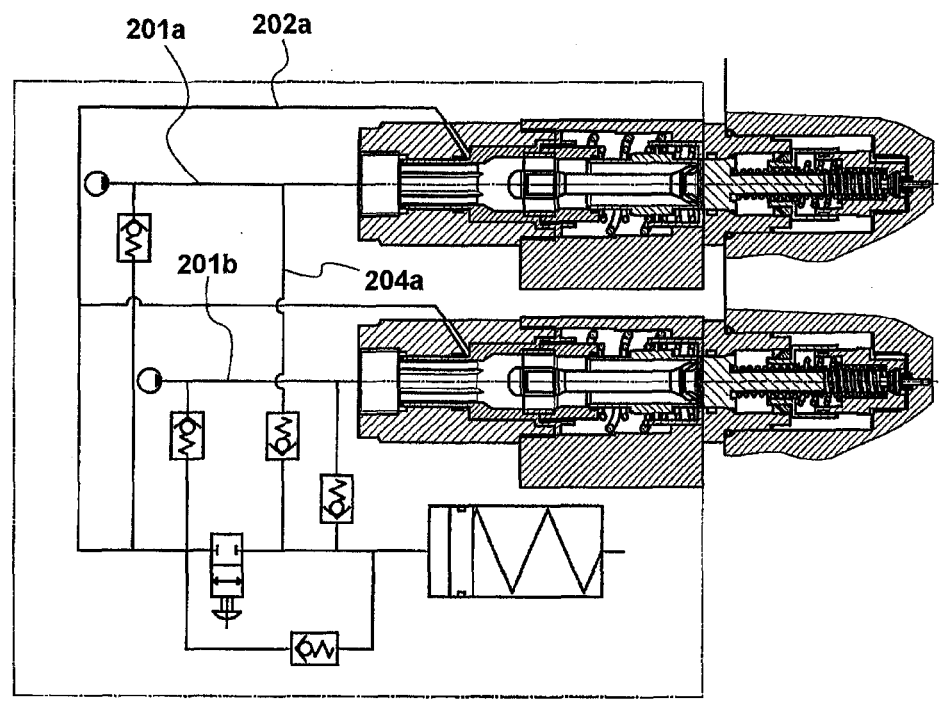

FIG. 11b shows a pressurization condition of the main hydraulic line 201b of a female coupling 11b.

The hydraulic lines in which pressurized fluid runs are shown by a bolder line in the diagram.

When the main hydraulic line 201b of a coupling 11b is pressurized and the female coupling is still closed, the pressurized fluid runs along the circuit through said hydraulic delivery connection 203b connected to said drain line 205.

No fluid runs along the return pipe 204b because of the presence of the one-way valve 40 placed on said pipe and oriented as shown in the figure.

Thus, the fluid runs along the drain line 205 and is intercepted by the mechanical locking and decompression means 100 and by the maximum pressure valve 300, so that the fluid itself is forced to return towards the couplings through said secondary hydraulic line 202b and 202a.

Thus, by virtue of the hydraulic circuit 200 all couplings connected to the circuit are pressurized also following the pressurization of only one of the main hydraulic lines 202 connected to only one coupling.

In the example provided in the accompanying figures, when the hydraulic line 201b related only to the coupling 11b is pressurized, the pressurization of the thrust chambers 37 of both couplings 11a and 11b is obtained.

Figure 11C:
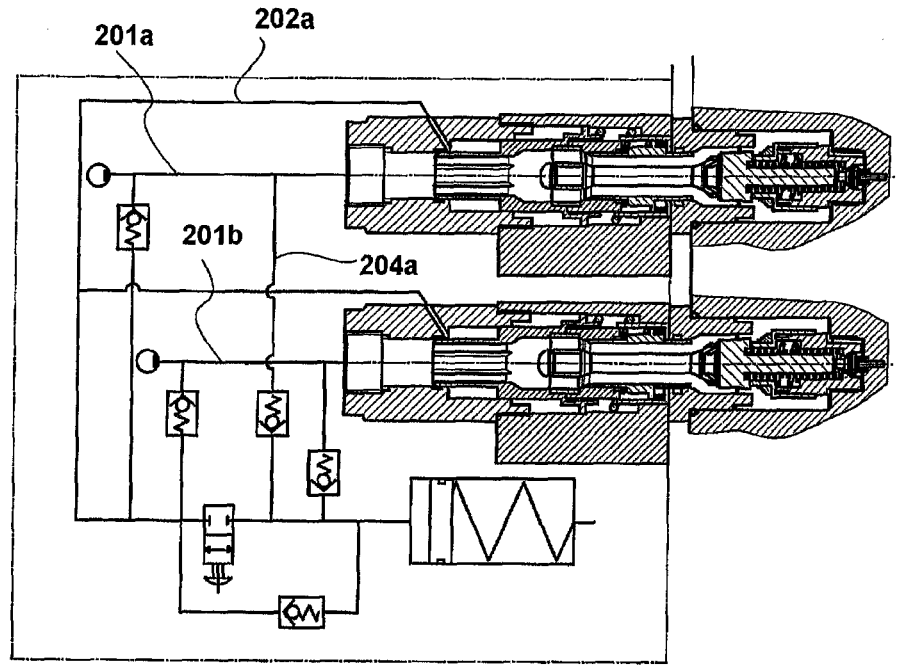

FIG. 11c shows the condition in which both female couplings 11a and 11b are open following the pressurization of the main hydraulic line 201b only.

Figure 11D:
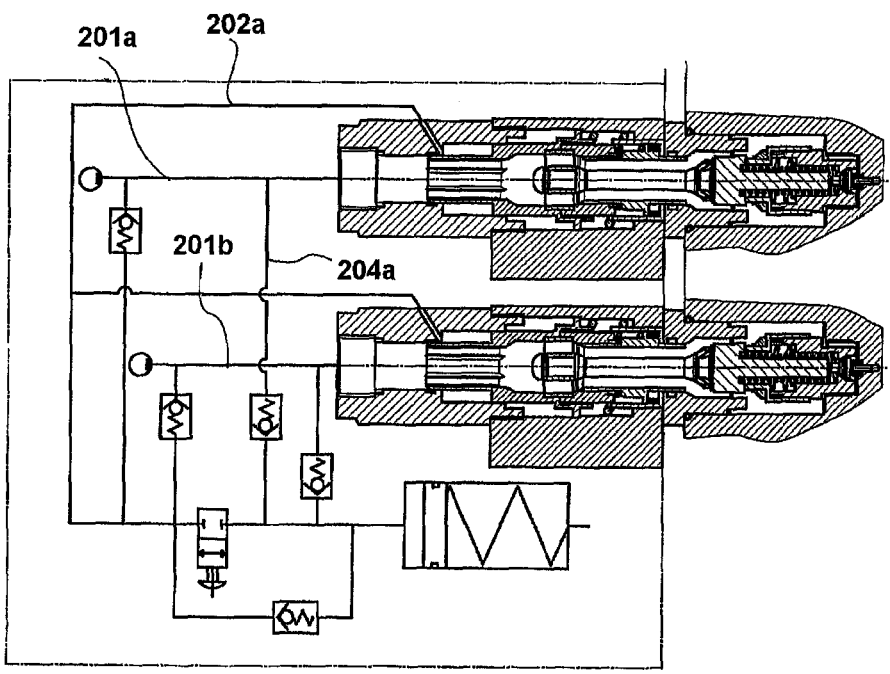

FIG. 11d shows the condition in which the pressure is missing in the main hydraulic line 201b. As shown in the diagram, by virtue of the presence of the locking and decompression means 100, of the maximum pressure valve 300 and of the one-way valves on the lines 203a and 203b, the pressurized fluid which occupies the thrust chambers 37 of the couplings 11a and 11b remains in the closed circuit, keeping the couplings open also in absence of pressure in the main lines 201.

Figure 11E:
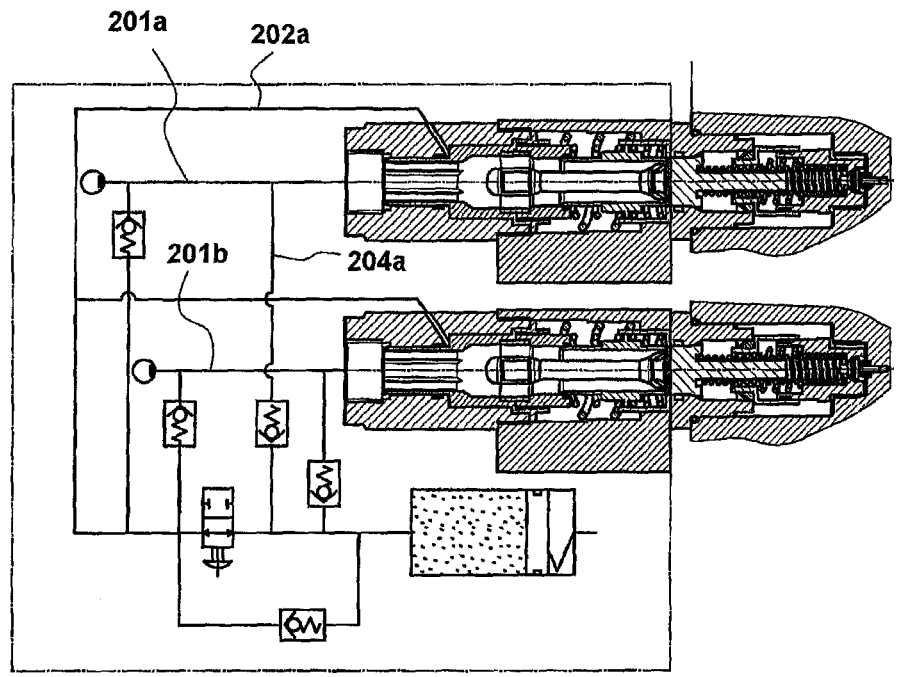

FIG. 11e shows the actuation condition of the locking and decompression means 100. When the operator acts on the locking and decompression means 100 the pressurized fluid present in the thrust chambers 37 of the female couplings passes into the accumulator 400 by virtue of the thrust of the springs 35 in the female couplings 11a and 11b. For safety reasons, the pressure in the accumulator 400 can also be relieved by opening the maximum pressure valve 300. The situation is shown in FIG. 11g.

Figure 9:
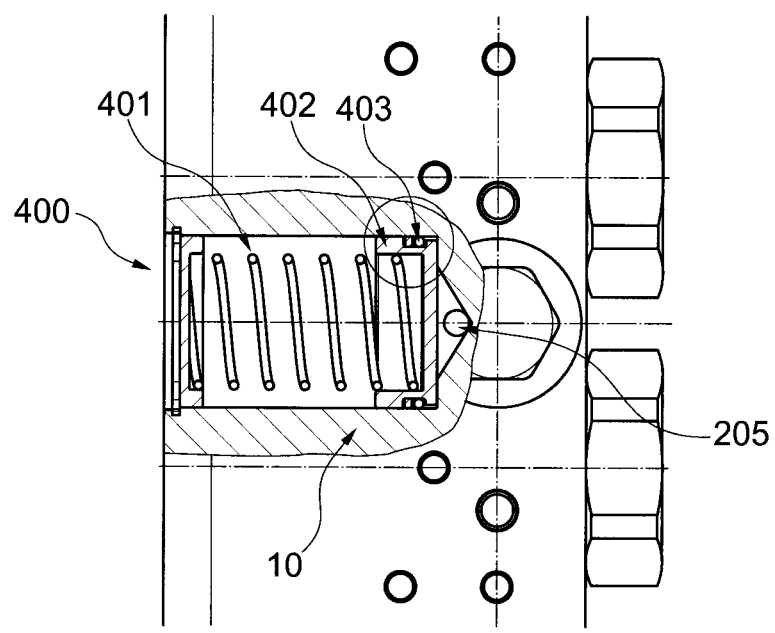
FIG. 9 shows a detail of a spring accumulator which equips the drain lines according to the present invention.

A cross-section view of a detail of the accumulator 400 is shown in FIG. 9. Such a figure illustrates a preferred embodiment of the accumulator according to the present invention: a spring 401 pushes a pin 402 to rest position. A seal 403 provides the sealing function between the pin 402 and the body of the fixed plate 10. When the pressurized oil arrives from the drain line 205, the spring 401 is compressed allowing an increase of volume of the accumulator. Such a volume is preventively dimensioned to be able to contain all the oil of the thrust chambers 37 of all female couplings 11 present on the fixed plate.

In particular, as mentioned, a closed circuit is created in which the oil remains trapped in order to keep the female coupling components in advanced position. If subjected to temperature increase, the oil in the closed circuit may generate excessive pressures and possibly damage some components. The presence of the maximum pressure valve 300 allows to relieve the pressure in excess from the circuit to the accumulator. Being the maximum pressure valve 300 calibrated to a predetermined pressure value, e.g. 400 bar, the pressure is relieved in the accumulator occurs only when such pressure values are reached.

Figure 11F:
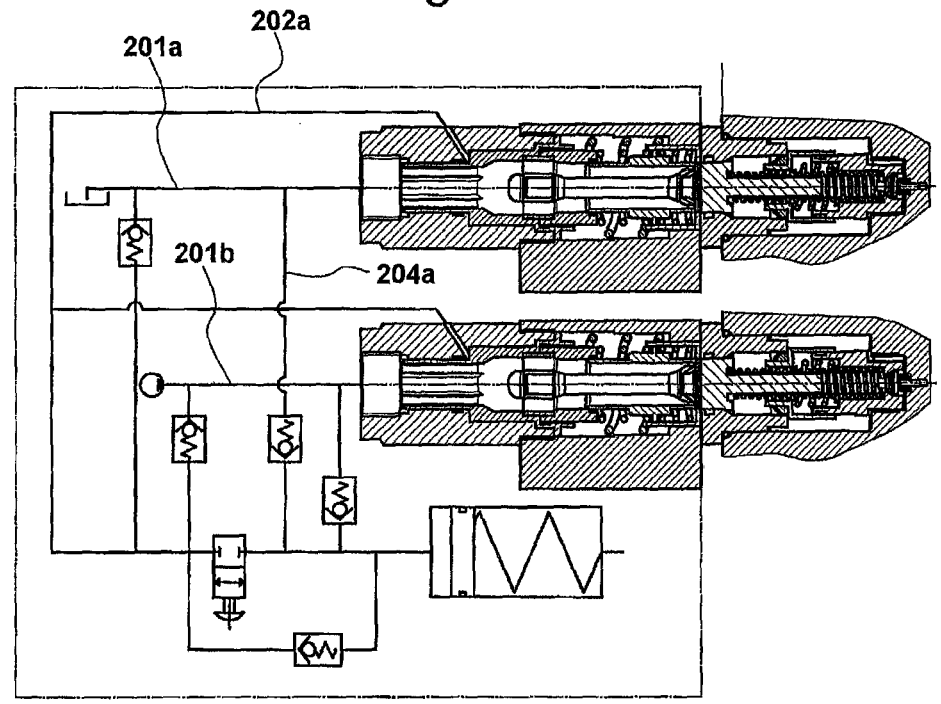
Figure 11G:
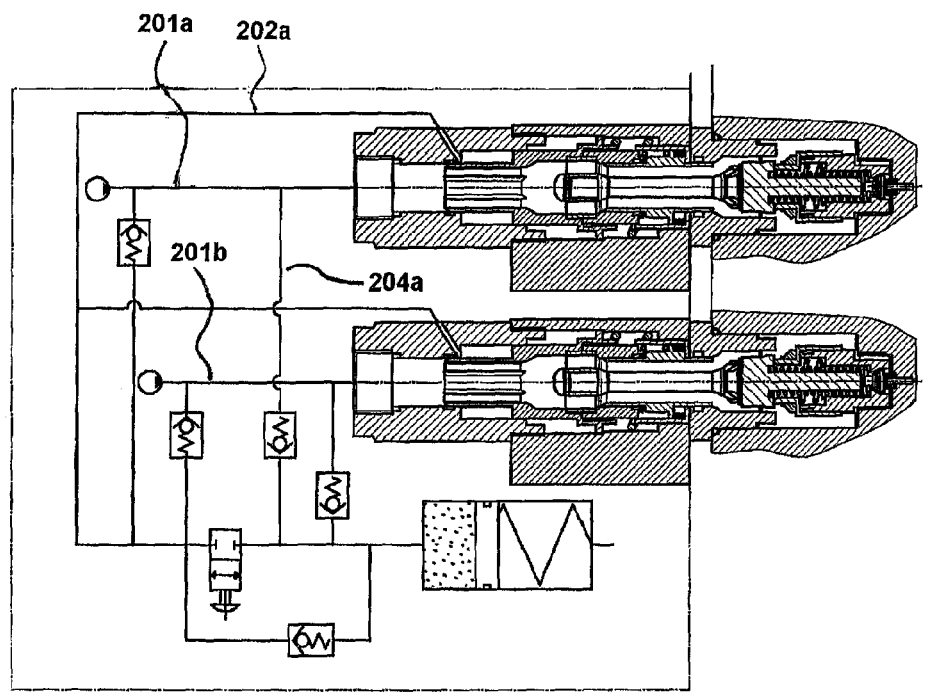

FIG. 11f shows a condition in which a line, in particular the main line 201a of the female coupling 11a, is relieved. According to the situation shown in FIG. 11f, the presence of the one-way valves 40 forces the fluid in the accumulator 400 to run through the return line 204a.

As shown hereto, the multi-coupling device connection according to the present invention thus reaches the predetermined task and objects.

In particular, the device allows the coupling of the couplings with a relative translational movement between the fixed plate and the mobile plate without using a lever.

Furthermore, by virtue of the multi-coupling device according to the invention the connection of the lines, i.e. the coupling of the male in the female, may occur in a different step with respect to the step of coupling of the plate.

Such a connection method of the lines is safer than the currently known solutions because it prevents residual pressures present in the couplings from causing dangerous leakages of pressurized oil during the coupling or uncoupling maneuvers of the plates.

Again, the hydraulic circuit integrated in the fixed plate allows the coupling of all female couplings at the same time, thus allowing to couple all the male couplings at the same time, even if only one line is pressurized.

The presence of one-way valves allows to lock the mobile equipment of the female couplings in advanced position, i.e. to lock the couplings in coupled position, thus allowing the passage of fluid even if the pressure in the main line is missing.

The multi-coupling device according to the present invention comprising a hydraulic circuit provided with integrated maximum pressure valve which relieves the excessive pressure which could be generated in the part of the circuit which locks the female couplings in open position allows to prevent accidental breakages caused by overpressure, e.g. caused by increases of oil temperature in the hydraulic circuit of the device itself.

Furthermore, the presence of locking and decompression means which can be controlled by the user and by a hydraulic accumulator in the circuit allows the simultaneous closing of all the female couplings even when there is no line connected to relief.

The invention claimed is:

1. A multi-coupling device for connection of a plurality of hydraulic and/or pneumatic lines fed with pressurized fluid through quick couplings, comprising a fixed plate and a mobile plate, said fixed plate having a flat upper coupling surface and supporting a plurality of female couplings, and said mobile plate supporting a plurality of male couplings and comprising a flat upper coupling surface, said device comprising coupling means for connecting said mobile plate to said fixed plate by sliding said flat upper coupling surface of said mobile plate on said flat upper coupling surface of said fixed plate so as to bring said male couplings into correspondence with said female couplings, wherein each of said female couplings is a flat-faced coupling comprising at least an adapter coupled with said fixed plate, said adapter having a substantially hollow cylindrical body which coaxially houses a back inner body, also having a hollow cylindrical shape and being axially movable with regard to said adapter, a thrust chamber being defined between said back inner body and said adapter, said female coupling further comprising at least a valve for closing said female coupling, said thrust chamber being hydraulically unbalanced in order to axially advance said back inner body when pressurized, thus causing advancement of the valve and the hydraulic connection of the female coupling with the corresponding male coupling.

2. The multi-coupling device according to claim 1, wherein said coupling means comprise on said fixed plate at least a first C-shaped profile whose concavity turns towards outside of the plate, and on said mobile plate a second C-shaped profile whose concavity turns towards inside of the plate.

3. The multi-coupling device according to claim 2, further comprising locking means to stably lock both plates to each other.

4. The multi-coupling device according to claim 3, wherein said locking means comprise a handle hinged on a side surface of said mobile plate, wherein a safety pin, axially mobile along a switching on/off direction substantially perpendicular to the side surface of said mobile plate, is further provided on a hinging point of said handle to the mobile plate and is directly axially moved by means of said handle.

5. The multi-coupling device according to claim 4, wherein said locking means comprise a pair of handles, each hinged on a side of said mobile plate, and a pair of locking pins.

6. The multi-coupling device according to claim 1, wherein said thrust chamber of each of said female couplings is in fluid connection with a pipe which is coupled with a main hydraulic line axially running along the female coupling.

7. The multi-coupling device according to claim 6, said fixed plate further comprising a hydraulic circuit connecting to each other the female couplings on said fixed plate.

8. The multi-coupling device according to claim 7, wherein said hydraulic circuit further comprises locking and decompression means which comprise, in turn, at least a mechanical safety catch, manually operable by a user and coupled with pressure relief means which comprise at least decompression valve.

9. The multi-coupling device according to claim 8, wherein said safety catch comprises at least an operating button to interact, in an axial stroke of the operating button, with a decompression shaft which, in turn, interacts with a decompression valve of said pressure relief means, thus opening said decompression valve, said operating button being at least partially inserted in a pawl and comprising a guide pin to be inserted in a corresponding helical guide groove formed on said pawl, said operating button having to be pushed and rotated to operate said decompression valve.

10. The multi-coupling device according to claim 9, wherein said hydraulic circuit comprises for each female coupling at least a main hydraulic line, at least a secondary hydraulic line coupled with said pipe, and at least a drain line coupled with said locking and decompression means and in fluid connection through said locking and decompression means with all female couplings in the fixed plate, said hydraulic circuit further comprising at least a hydraulic supply connection and a hydraulic return connection for each coupling, which respectively connect said main hydraulic line to said drain line and a plurality of one-way valves.

11. The multi-coupling device according to claim 10, wherein said hydraulic circuit further comprises at least a maximum pressure valve and at least an accumulator.

12. The multi-coupling device according to claim 11, wherein said safety catch and said accumulator allow, disconnection of the mobile plate without having to reduce the hydraulic pressure in a circuit of an operating machine connected to said fixed plate.

13. The multi-coupling device according to claim 8, wherein said hydraulic circuit comprises for each female coupling at least a main hydraulic line, at least a secondary hydraulic line coupled with said pipe, and at least a drain line coupled with said locking and decompression means and in fluid connection through said locking and decompression means with all female couplings in the fixed plate, said hydraulic circuit further comprising at least a hydraulic supply connection and a hydraulic return connection for each coupling, which respectively connect said main hydraulic line to said drain line and a plurality of one-way valves.

* * * * *